(No Model.)
W. T. ARBUCKLE.
COTTON CHOPPER.
No. 357,058. Patented Feb. 1, 1887.
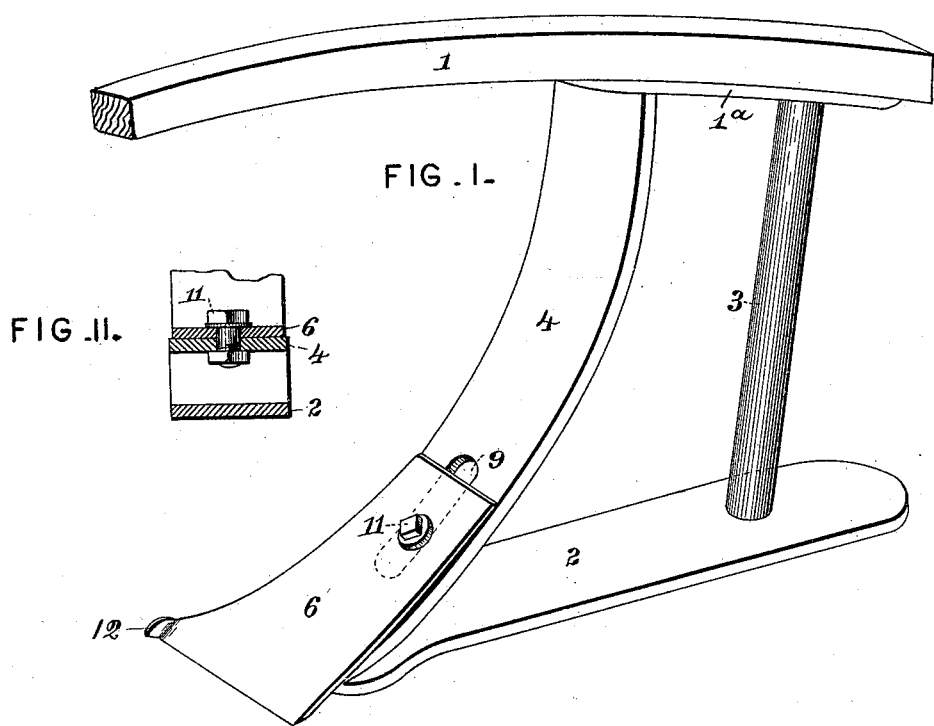
Attest:
Geo. T. Smallwood.
F. A. Hopkins.
Inventor:
William T. Arbuckle
By Knight Bros.
attys

UNITED STATES PATENT OFFICE.

WILLIAM T. ARBUCKLE, OF BARTLETT, TENNESSEE.

COTTON-CHOPPER.

SPECIFICATION forming part of Letters Patent No. 357,058, dated February 1, 1887.

Application filed June 14, 1886. Serial No. 205,136. (No model.)

*To all whom it may concern:*

Be it known that I, WILLIAM T. ARBUCKLE, a citizen of the United States, residing at Bartlett, in the county of Shelby and State of Tennessee, have made certain new and useful Improvements in Cotton-Choppers, of which the following is a specification.

My invention consists in certain details of construction of the implement, which will first be fully described with reference to the accompanying drawings, and then pointed out in the claim.

In said drawings, Figure I is a perspective view of a portion of my improved chopper. Fig. II is a transverse sectional view through the attaching-bolt of the chopper.

The frame or rigid portion of the implement consists of the beam 1, a portion of which is shown in Fig. I—the upper plate, 1ª, the flat sole or foot-piece 2, rear vertical standard, 3, and front curved standard, 4. These parts are fixed together by bolts and rivets, as usual. The beam has customary handles and means of draft attachment. (Not shown.) The sole or foot-piece 2 is made broad and flat, its purpose being to limit the depth of penetration of the scraper or chopper into the ground.

The chopper 6 is curved inwardly from its upper end to its cutting-edge on the inner side, and is attached directly to the standard by bolt 11, passing through the vertical slot 9. Its cutting-edge is thus arranged at right angles to the beam of the implement. In order to prevent the inadvertent chopping of the few cotton-plants which I prefer to leave as making a fair "stand," I provide on either or both sides of the chopper an upturned lip, 12, whose action will be readily understood.

Having thus described my invention, the following is what I claim as new therein and desire to secure by Letters Patent:

The combination of a beam, 1, the frame 2 3 4, having longitudinal slot 9, the chopper 6, formed with a short lip, 12, and curved inner edge extending from the upper end of the chopper to the lip, and a bolt, 11, substantially as shown and described.

WM. T. ARBUCKLE.

Witnesses:
   W. R. CROSS,
   S. HALLE,
   JULIUS BEHR.